Dec. 5, 1967  M. POUCHER ET AL  3,355,884
ANNULAR COMBUSTION CHAMBERS FOR GAS TURBINE ENGINES WITH
IMPROVED GUIDE VANES FOR MIXING AIR
WITH COMBUSTION GASES
Filed Nov. 19, 1965

INVENTORS
MICHAEL POUCHER
ARTHUR BILL

BY
Cushman, Darby & Cushman
ATTORNEYS

United States Patent Office 3,355,884
Patented Dec. 5, 1967

3,355,884
ANNULAR COMBUSTION CHAMBERS FOR GAS TURBINE ENGINES WITH IMPROVED GUIDE VANES FOR MIXING AIR WITH COMBUSTION GASES
Michael Poucher and Arthur Bill, Derby, England, assignors to Rolls-Royce Limited, Derby, England, a British company
Filed Nov. 19, 1965, Ser. No. 508,760
Claims priority, application Great Britain, Dec. 2, 1964, 49,100/64
5 Claims. (Cl. 60—39.74)

ABSTRACT OF THE DISCLOSURE

An annular combustion chamber for a gas turbine engine having an annular axially directed air inlet at one end, an annular outlet at the other end, a fuel injector which is radially offset from the inlet, a plurality of angularly spaced aerofoil-shaped guide vanes extending axially within and radially completely across the combustion chamber, the leading edges of each guide vane being flattened and having two spaced apart flat strips connected thereto to form a radially extending channel for turning the axially flowing air radially.

---

The present invention relates to annular combustion chambers, and has particular, but not exclusive, relation to combustion chambers for use in gas turbine engines.

According to the present invention there is provided an annular combustion chamber for a gas turbine engine having an annular axially directed air inlet at one end thereof through which it may be supplied with air and an annular outlet at the other end and through which combustion gases may be delivered, a fuel injector for injecting fuel into the chamber, said fuel injector being radially offset from said inlet, a plurality of angularly spaced substantially aerofoil-shaped guide vanes disposed in and extending radially completely across said chamber, said guide vanes extending axially within the combustion chamber, and whirl-causing means on the leading edges of each guide vane for directing the axially flowing air radially to promote mixing of said air with the combustion gases.

Preferably the leading edge of each guide vane is formed with a radially extending channel which is open in the direction of flow.

The side walls of each channel may be formed by two spaced apart flat strips connected to the sides of the respective guide vane adjacent the leading edge thereof and projecting upstream therefrom, the bottom of each channel being formed by the upstream-facing end surfaces of the respective guide vane.

The leading edges of the guide vanes may be flattened between the flat strips.

Preferably the leading edges of the flat strips are outwardly concave in a radial direction.

The invention also provides a gas turbine engine incorporating such a combustion chamber.

Figure 1:
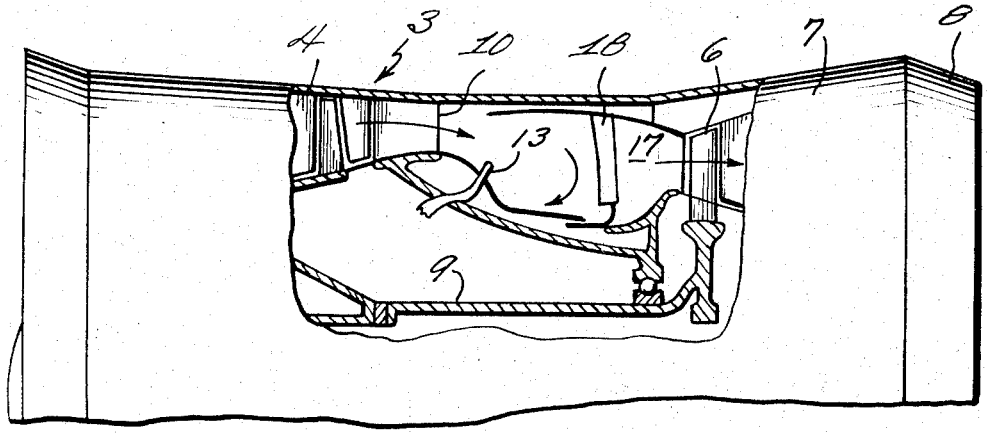
Figure 2:
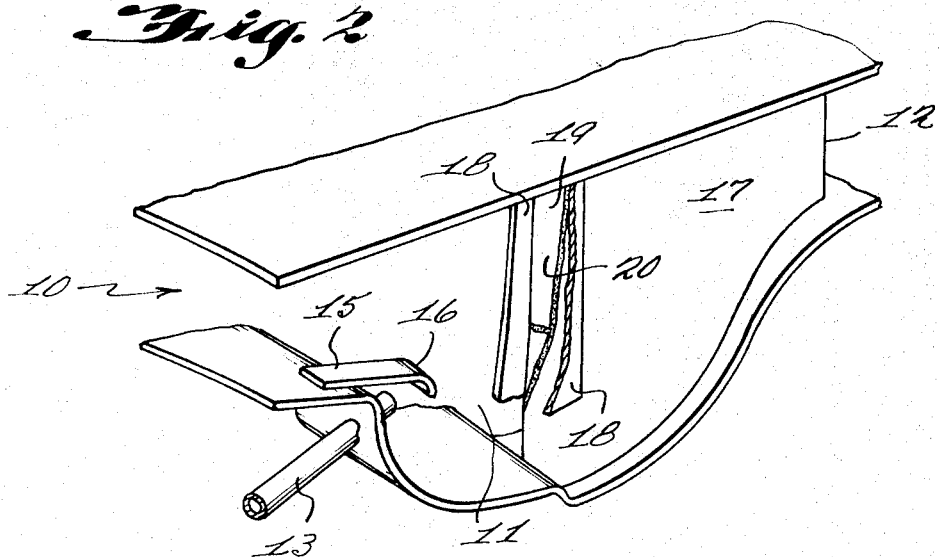

A preferred embodiment of the invention will now be described by way of example only and with reference to the accompanying drawings, in which:

FIGURE 1 is a diagrammatic side elevation, partly broken away, of a gas turbine engine provided with an annular combustion chamber according to the present invention, and FIGURE 2 is a perspective part sectional view of the combustion chamber of the gas turbine engine of FIGURE 1.

Referring to the drawings, a gas turbine engine 3 comprises, in axial flow series, axial-flow compressor means 4, combustion equipment 5, axial-flow turbine means 6, exhaust assembly 7 and a jet nozzle 8. The turbine means 6 and the compressor means 4 are drivingly interconnected by shafting 9 in a conventional manner. The engine 3 operates in the well-known manner which will not be described in detail.

The combustion equipment 5 comprises a combustion chamber of annular form having, in flow series, an air inlet 10 to receive air from the compressor means 4 of the gas turbine engine, a combustion and mixing zone 11, and a combustion gas outlet 12. Fuel is supplied to the combustion zone 11 from a plurality of angularly spaced apart fuel supply pipes 13 (only one shown), the outlet 14 of each pipe 13 being arranged to direct the fuel onto a respective splash plate 15. Each splash plate 15 has a curled downstream edge 16 such that, in operation, fuel is dispersed into the passing stream of air, so as to be atomised thereby, in a direction which is generally parallel to the edge 16.

The fuel and air mixture is ignited by suitable means, which may be a sparking plug (not shown) or the heat generated from previously burnt mixture, and, in the subsequent expansion due to the temperature rise, passes towards the outlet 12. Downstream of the outlet 12, the gases are allowed to expand in a work producing turbine (not shown) of the gas turbine engine, and in order to ensure that the gases ener the turbine at the correct predetermined angle, a plurality of angularly spaced apart guide vanes 17 (only one shown) are provided in the combustion chamber which extend axially substantially from the combustion zone 11 to the outlet 12. The guide vanes 17, which are disposed in and extend radially across the outlet 12, have a suitable aerodynamic shape in order to offer generally a mimimal resistance to the gas flow.

The hot gases leaving the combustion zone 11 have a tendency to stratify in isothermal planes along the length of the combustion chamber and thus to produce uneven temperature distribution along the lengths of the turbine blades of the turbine. It is desirable thhat the gases entering the turbine be of uniform temperature so that the turbine can operate at the highest selected temperature for the material of which it is composed.

In order to reduce this stratification tendency, and to promote mixing of the hottest and coolest gases present in the combustion chamber, each guide vane 17 is provided with a number of spaced apart flat strips 18, of which two are illustrated in the drawing, the strips 18 forming with the leading edge of the respective guide vane 17 a channel 19. Thus the strips 18 form side walls of the respective channel 19 and project upstream of the respective guide vane 17, the leading edge of the latter forming the bottom of the channel. Each channel 19 has the effect of directing radially a portion of the incoming air which it receives from the inlet 10 so that the gases in the combustion zone 11 take on a whirling motion, clockwise as seen in the drawing, which promotes mixing of the hot combustion gases with the incoming air and breaks up any temperature strata which may tend to form.

It will be seen that the leading edges of the strips 18 are outwardly concave in a radial direction and are fastened to the respective guide vane 17 on either side of a flattened part 20 of the leading edge thereof in such manner that the channel 19 is part annular with a flattened outer side. This configuration enables the said portion of incoming air to be directed more smoothly towards the combustion zone 11. As well as helping the hot and cold gases to mix, the strips 18 in co-operation with the guide vanes 17 reduce the possibility of the upstream edges of guide vanes 17 being subjected to the maximum temperatures in combustion zone 11.

If desired, more than two strips 18 may be attached to each guide vane 17.

We claim:

1. An annular combustion chamber for a gas turbine engine having an annular axially directed air inlet at one end thereof through which the combustion chamber may be supplied with air and an annular outlet at the other end through which combustion gases may be delivered, a fuel injector for injecting fuel into the combustion chamber, said fuel injector being radially offset from said inlet, a plurality of angularly spaced substantially aerofoil-shaped guide vanes disposed in and extending radially completely across said combustion chamber, said guide vanes extending axially within the combustion chamber, and whirl-causing means on the leading edges of each guide vane for directing the axially flowing air radially to promote mixing of said air with combustion gases.

2. A combustion chamber according to claim 1 wherein the whirl-causing means consists of a radially extending channel formed in the leading edge of each guide vane so as to be open in the direction of flow.

3. A combustion chamber according to claim 2 in which the side walls of each channel are formed by two spaced apart flat strips connected to the sides of the respective guide vane adjacent the leading edge thereof and projecting upstream therefrom, the bottom of each channel being formed by the upstream-facing end surfaces of the respective guide vanes.

4. A combustion chamber according to claim 3 in which the leading edges of the guide vanes are flattened between the flat strips.

5. A combustion chamber according to claim 3 in which the leading edges of the flat strips are outwardly concave in a radial direction.

References Cited
UNITED STATES PATENTS

| | | | |
|---|---|---|---|
| 2,977,760 | 4/1961 | Soltau et al. | 60—39.65 |
| 3,242,674 | 3/1966 | Clarke et al. | 60—39.65 |

JULIUS E. WEST, *Primary Examiner.*